United States Patent
Wang et al.

(10) Patent No.: US 12,464,226 B2
(45) Date of Patent: Nov. 4, 2025

(54) PHOTOGRAPHING METHOD AND APPARATUS FOR INTELLIGENT FRAMING RECOMMENDATION

(71) Applicant: HUAWEI TECHNOLOGIES CO., LTD., Guangdong (CN)

(72) Inventors: Yinting Wang, Hangzhou (CN); Feilong Ma, Beijing (CN); Xingguang Song, Tokyo (JP); Yi Lei, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/343,942

(22) Filed: Jun. 29, 2023

(65) Prior Publication Data

US 2023/0353864 A1    Nov. 2, 2023

Related U.S. Application Data

(63) Continuation of application No. PCT/CN2021/140208, filed on Dec. 21, 2021.

(30) Foreign Application Priority Data

Dec. 31, 2020 (CN) .......................... 202011615964.9

(51) Int. Cl.
*H04N 23/60* (2023.01)
*G06T 3/60* (2006.01)
(Continued)

(52) U.S. Cl.
CPC .............. *H04N 23/64* (2023.01); *G06T 3/60* (2013.01); *H04N 23/632* (2023.01); *H04N 23/80* (2023.01); *H04N 23/95* (2023.01)

(58) Field of Classification Search
CPC ...... H04N 23/64; H04N 23/632; H04N 23/80; H04N 23/95; H04N 23/45; H04N 23/617;
(Continued)

(56) References Cited

U.S. PATENT DOCUMENTS

| | | | |
|---|---|---|---|
| 2015/0116350 A1* | 4/2015 | Lin | G06N 7/01 345/620 |
| 2019/0208117 A1* | 7/2019 | Jung | H04N 23/635 |
| 2019/0222772 A1 | 7/2019 | Yang | |

FOREIGN PATENT DOCUMENTS

| | | |
|---|---|---|
| CN | 102647552 A | 8/2012 |
| CN | 106060386 A | 10/2016 |

(Continued)

OTHER PUBLICATIONS

Office Action issued in CN202011615964.9, dated Apr. 12, 2023, 12 pages.

(Continued)

*Primary Examiner* — Yogesh K Aggarwal

(57) ABSTRACT

The present disclosure relates to the field of image processing technologies, and discloses a photographing method and apparatus for intelligent framing recommendation, to automatically match an appropriate framing recommendation solution for a user according to an algorithm, so that imaging quality is improved. The method includes: An electronic device obtains at least one framing recommendation result based on images captured by at least two cameras with different focal lengths, where each of the at least one framing recommendation result includes a framing recommendation frame, and the framing recommendation frame indicates a framing recommendation effect of image photographing; and displays a target image based on a framing recommendation result selected by a user among the at least one framing recommendation result, where the target image is (Continued)

---

401 — An electronic device obtains an image and displays the image on a preview interface in real time 402 — The electronic device obtains at least one framing recommendation result based on the image captured in real time 403 — The electronic device displays a target image in real time based on a framing recommendation result selected by a user obtained through cropping, based on the selected framing recommendation result, the images captured by the at least two cameras.

17 Claims, 12 Drawing Sheets

(51) Int. Cl.
*H04N 23/63* (2023.01)
*H04N 23/80* (2023.01)
*H04N 23/95* (2023.01)

(58) Field of Classification Search
CPC .... H04N 23/635; H04N 23/631; H04N 23/69; G06T 3/60; G06V 10/945; G06V 20/35; G06V 10/24; G06V 10/82; G06N 3/09; G06N 3/08
See application file for complete search history.

(56) References Cited

FOREIGN PATENT DOCUMENTS

| | | |
|---|---|---|
| CN | 106851107 A | 6/2017 |
| CN | 108093174 A | 5/2018 |
| CN | 108255385 A | 7/2018 |
| CN | 108833784 A | 11/2018 |
| CN | 106131411 B | 4/2019 |
| CN | 111182225 A | 5/2020 |
| KR | 20190043032 A | 4/2019 |
| KR | 20200101230 A | 8/2020 |

OTHER PUBLICATIONS

Extended European Search Report issued in EP21914050.6, dated May 6, 2024, 11 pages.
International Search Report and Written Opinion issued in PCT/CN2021/140208, dated Mar. 16, 2022, 9 pages.

\* cited by examiner

PHOTOGRAPHING METHOD AND APPARATUS FOR INTELLIGENT FRAMING RECOMMENDATION

CROSS-REFERENCE TO RELATED APPLICATIONS

This application is a continuation of International Application No. PCT/CN2021/140208, filed on Dec. 21, 2021, which claims priority to Chinese Patent Application No. 202011615964.9, filed on Dec. 31, 2020. The disclosures of the aforementioned applications are hereby incorporated by reference in their entireties.

TECHNICAL FIELD

The present disclosure relates to the field of image processing technologies, and in particular, to a photographing method and apparatus for intelligent framing recommendation.

BACKGROUND

Currently, an increasing quantity of users choose to take photos with mobile electronic devices, for example, smartphones, tablet computers, or wearable devices. Therefore, a current mobile electronic device is usually equipped with two or more camera lenses, for example, a standard lens with a field of view of 45 degrees, a long-focus lens with a field of view of less than 40 degrees, and a wide-angle lens with a field of view of more than 60 degrees. The electronic device may match and switch between different camera lenses or a plurality of camera lenses based on different photographing scenes to perform joint imaging, to assist the user in photographing a high-quality image.

Composition in photographing techniques requires professional skills. Common users lack professional photography knowledge, and therefore it is difficult to take a photo that has perfect composition and complies with aesthetic rules. In an existing technical method of intelligently switching between cameras to assist in composition, a foreground category in a currently photographed image of a user is identified, an appropriate composition template is matched, and switching is performed between a wide-angle lens and a long-focus lens based on the composition template to perform imaging, to obtain an image that meets a current composition suggestion.

However, due to limitations of a scene type and a composition template, the foregoing technical method does not have a good composition recommendation capability for a scene without a foreground. In addition, the technical method is based on switching between a wide-angle lens and a long-focus lens. After an image generated by a single lens is cropped or zoomed based on a composition template, the quality of the image is poor.

SUMMARY

The present disclosure provides a photographing method and apparatus for intelligent framing recommendation, to automatically match an appropriate framing recommendation solution for a user according to an algorithm, so that imaging quality is improved.

To achieve the foregoing objective, the present disclosure uses the following technical solutions.

According to a first aspect, a photographing method for intelligent framing recommendation is provided, and is applied to an electronic device equipped with at least two cameras with different focal lengths. The method includes: The electronic device obtains at least one framing recommendation result based on images captured by the at least two cameras with different focal lengths, where the framing recommendation result includes a framing recommendation frame, and the framing recommendation frame indicates a framing recommendation effect of image photographing; and displays a target image based on a framing recommendation result selected by a user, where the target image is an image obtained through cropping, based on the framing recommendation result, the images captured by the at least two cameras.

In the foregoing technical solution, deep learning is performed on joint imaging of a plurality of cameras to obtain a framing recommendation result, so that the electronic device may automatically crop or rotate, based on the framing recommendation result, images jointly captured by the plurality of cameras, to obtain more optimized composition and a more optimized framing field of view, thereby improving image photographing quality of the electronic device and improving photographing experience of a user.

In a possible implementation, the framing recommendation result further includes at least one of a horizontal reference line or a vertical reference line, and the horizontal reference line and the vertical reference line indicate to rotate the images captured by the at least two cameras to obtain the target image.

In the foregoing possible implementation, the electronic device may automatically perform rotation correction on an image, so that when a user photographs a specific scene or detects that the image includes a specific line, a skew or a tilt in an image photographed by the user can be avoided without manual adjustment of the user, and image quality is high, thereby improving photographing experience of the user.

In a possible implementation, the framing recommendation result further includes a thumbnail corresponding to the framing recommendation frame, and the thumbnail is a thumbnail obtained through cropping, based on the framing recommendation frame, the images captured by the at least two cameras.

In the foregoing possible implementation, the electronic device displays a thumbnail corresponding to a framing recommendation frame, so that a user can intuitively view a photographing effect of framing recommendation, to increase a probability of using a framing recommendation function by the user, thereby improving interaction experience of the user.

In a possible implementation, the obtaining at least one framing recommendation result based on images captured by the at least two cameras specifically includes: performing scene detection based on the images captured by the at least two cameras, to obtain composition structure information; and performing, by using a framing recommendation model, photographing composition calculation on the images captured by the at least two cameras and the composition structure information, to obtain the at least one framing recommendation result.

In the foregoing possible implementation, the electronic device may perform, by using a framing recommendation model, framing composition calculation on images captured by the at least two cameras, and obtain a matched framing recommendation result by using high calculation efficiency of a neural network, thereby improving real-time performance and accuracy of image processing calculation, and improving image processing efficiency.

In a possible implementation, a size of the framing recommendation frame is less than a first threshold and is greater than or equal to a second threshold, the first threshold is set based on an imaging range corresponding to a camera with a large field of view in the plurality of cameras, and the second threshold is set based on an imaging range corresponding to a camera with a small field of view in the plurality of cameras.

In the foregoing possible implementation, the electronic device determines a range of a size of a framing recommendation frame by using features of a plurality of different cameras, to recommend an appropriate framing recommendation frame to a user, so that a framing recommendation result has appropriate composition, and a photographing field of view has an appropriate size, and the user does not feel abruptness, thereby improving photographing experience of the user.

According to a second aspect, a photographing method for intelligent framing recommendation is provided, and is applied to an electronic device equipped with at least two cameras with different focal lengths. The method includes: obtaining, in response to a first operation of a user, at least one framing recommendation result based on images captured by the at least two cameras, where the framing recommendation result includes a framing recommendation frame, and the framing recommendation frame indicates a framing recommendation effect of image photographing; receiving a second operation of the user, where the second operation indicates the user to determine a first framing recommendation frame from the at least one framing recommendation result; and updating, in response to the second operation, a real-time preview image to a target image, where the target image is an image obtained through cropping, based on the first framing recommendation frame, the images captured by the at least two cameras.

In a possible implementation, the framing recommendation result further includes at least one of a horizontal reference line or a vertical reference line, and the horizontal reference line and the vertical reference line indicate to rotate the images captured by the at least two cameras to obtain the target image.

In a possible implementation, the framing recommendation result further includes a thumbnail corresponding to the framing recommendation frame, and the thumbnail is a thumbnail obtained through cropping, based on the framing recommendation frame, the images captured by the at least two cameras.

In a possible implementation, the obtaining at least one framing recommendation result based on images captured by the at least two cameras specifically includes: performing scene detection based on the images captured by the at least two cameras, to obtain composition structure information; and performing, by using a framing recommendation model, photographing composition calculation on the images captured by the at least two cameras and the composition structure information, to obtain the at least one framing recommendation result.

In a possible implementation, a size of the framing recommendation frame is less than a first threshold and is greater than or equal to a second threshold, the first threshold is set based on an imaging range corresponding to a camera with a large field of view in the plurality of cameras, and the second threshold is set based on an imaging range corresponding to a camera with a small field of view in the plurality of cameras.

In a possible implementation, after the updating a real-time preview image to a target image, the method further includes: separately storing, in response to a photographing confirmation operation of the user, the target image and the images captured by the at least two cameras with different focal lengths.

In a possible implementation, the method further includes: obtaining at least one framing optimization result based on the target image, where the framing optimization result includes the framing recommendation frame, and the framing optimization result indicates to perform framing optimization on the target image again.

According to a third aspect, a photographing apparatus for intelligent framing recommendation is provided. The apparatus includes: a framing recommendation module, configured to obtain at least one framing recommendation result based on images captured by the at least two cameras, where the framing recommendation result includes a framing recommendation frame, and the framing recommendation frame indicates a framing recommendation effect of image photographing; and an imaging module, configured to display a target image based on a framing recommendation result selected by a user, where the target image is an image obtained through cropping, based on the framing recommendation result, the images captured by the at least two cameras.

In a possible implementation, the framing recommendation result further includes at least one of a horizontal reference line or a vertical reference line, and the horizontal reference line and the vertical reference line indicate to rotate the images captured by the at least two cameras to obtain the target image.

In a possible implementation, the framing recommendation result further includes a thumbnail corresponding to the framing recommendation frame, and the thumbnail is a thumbnail obtained through cropping, based on the framing recommendation frame, the images captured by the at least two cameras.

In a possible implementation, the framing recommendation module is specifically configured to: perform scene detection based on the images captured by the at least two cameras, to obtain composition structure information; and perform, by using a framing recommendation model, photographing composition calculation on the images captured by the at least two cameras and the composition structure information, to obtain the at least one framing recommendation result.

In a possible implementation, a size of the framing recommendation frame is less than a first threshold and is greater than or equal to a second threshold, the first threshold is set based on an imaging range corresponding to a camera with a large field of view in the plurality of cameras, and the second threshold is set based on an imaging range corresponding to a camera with a small field of view in the plurality of cameras.

According to a fourth aspect, an electronic device is provided. The electronic device includes: a processor; and a memory, configured to store instructions executable by the processor, where the processor is configured to execute the instructions, to implement the method according to the first aspect or second aspect.

According to a fifth aspect, a computer-readable storage medium is provided. When instructions in the computer-readable storage medium are executed by a processor of an electronic device, the electronic device is enabled to perform the method according to the first aspect or second aspect.

According to a sixth aspect, a computer program product is provided. When the computer program product is run on a computer, the computer is enabled to perform the method according to the first aspect or second aspect.

It may be understood that any photographing apparatus for intelligent framing recommendation, computer-readable storage medium, or computer program product provided above may be implemented by using the corresponding method provided above. Therefore, for beneficial effects that can be achieved by the electronic device, the computer-readable storage medium, or the computer program product, refer to beneficial effects in the corresponding method provided above. Details are not described herein again.

DESCRIPTION OF EMBODIMENTS

The terms "first" and "second" mentioned below are merely intended for the purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

It should be noted that the term "for example" or "such as" in the present disclosure means used as an example, an illustration, or a description. Any embodiment or design scheme described as "for example" or "such as" in the present disclosure should not be explained as being more preferred or having more advantages than another embodiment or design scheme. Exactly, use of the term such as "for example" or "such as" is intended to present a related concept in a specific manner.

The following clearly and completely describes the technical solutions in embodiments of the present disclosure with reference to the accompanying drawings in embodiments of the present disclosure. It is clear that the described embodiments are merely some but not all of embodiments of the present disclosure. All other embodiments obtained by a person of ordinary skill in the art based on embodiments of the present disclosure without creative efforts shall fall within the protection scope of the present disclosure.

An image photographing method provided in embodiments of the present disclosure may be applied to an electronic device having a photographing capability and an image processing capability. The electronic device may be a mobile phone, a tablet computer, a desktop computer, a laptop computer, a handheld computer, a notebook computer, a vehicle-mounted device, an ultra-mobile personal computer (UMPC), a netbook, a cellular phone, a personal digital assistant (PDA), an augmented reality (AR) device/a virtual reality (VR) device, or the like. A specific form of the electronic device is not specially limited in embodiments of the present disclosure.

Figure 1:
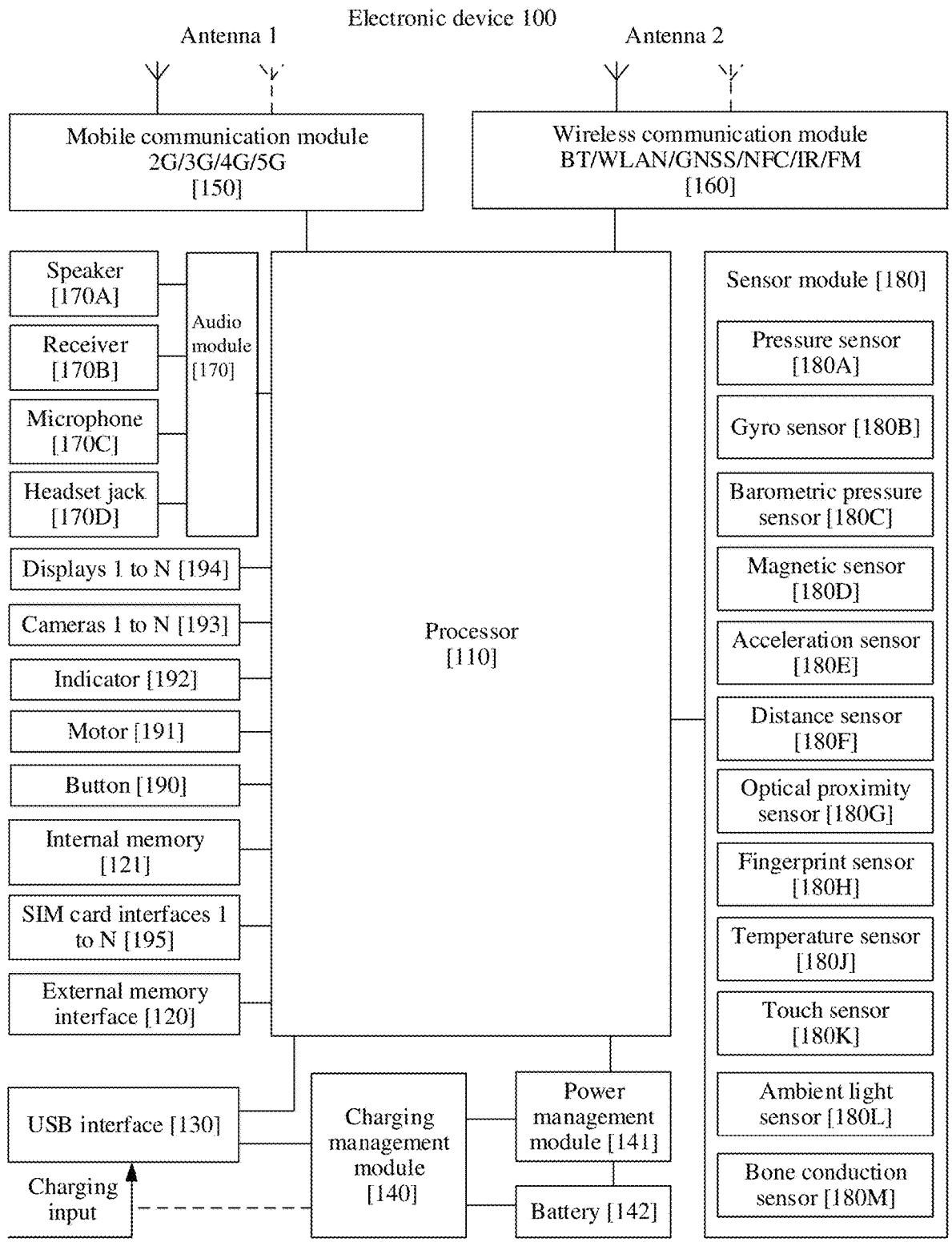
FIG. 1 is an architectural diagram of a hardware system of an electronic device according to an embodiment of the present disclosure.

FIG. 1 is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of the present disclosure does not constitute a specific limitation on the electronic device 100. In some other embodiments of the present disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

It may be understood that an interface connection relationship between the modules shown in embodiments of the present disclosure is merely an example for description, and constitutes no limitation on the structure of the electronic device 100. In some other embodiments of the present disclosure, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The mobile communication module 150 may provide a solution applied to the electronic device 100 for wireless communication such as 2G/3G/4G/5G. The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, for example, a long-focus camera, a medium-focus camera, a short-focus (wide-angle) camera, or a wide-angle black-and-white camera, where N is a positive integer greater than 1.

In some embodiments of the present disclosure, the electronic device 100 may include a wide-angle camera, and an ultra-wide-angle camera or a long-focus camera. The electronic device may generate a real-time preview image based on an image captured by the wide-angle camera. Further, the electronic device may further recommend, to a user based on the real-time preview image, a viewfinder frame corresponding to an image captured by the ultra-wide-angle camera or the long-focus camera, and perform multi-camera fusion imaging and cropping based on the viewfinder frame, to improve imaging composition quality and improve photographing experience of the user.

In addition, in some other embodiments of the present disclosure, the electronic device 100 may include a long-focus camera, and a medium-focus camera or a short-focus (wide-angle) camera. The electronic device may recommend, to a user based on a real-time preview image captured by the long-focus camera, a viewfinder frame corresponding to an image captured by the medium-focus camera or the short-focus (wide-angle) camera, and perform multi-camera fusion imaging and cropping based on the viewfinder frame, to improve imaging composition quality and improve photographing experience of the user.

It should be noted that the long-focus camera, the medium-focus camera, or the short-focus (wide-angle) camera equipped on the electronic device 100 in the present disclosure should be located on a same side of the electronic device 100, for example, located on a front side (a front-facing camera) or a rear side (a rear-facing camera) of a screen of the electronic device 100. A specific technical solution is described below in detail.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The internal memory 121 may be configured to store computer-executable program code. The executable program code includes instructions. The processor 110 implements various functional applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (UFS).

In embodiments of the present disclosure, the internal memory 121 may store computer program code used to implement the steps in the method embodiments of the present disclosure.

The processor 110 may run the computer program code that is of the steps in the method embodiments of the present disclosure and that is stored in the memory 121. The display 194 may be configured to display a photographed object of the camera, a real-time video frame, and the like in embodiments of the present disclosure.

A software system of the electronic device 100 may use a layered architecture, an event-driven architecture, a microkernel architecture, a micro service architecture, or a cloud architecture. In embodiments of the present disclosure, an Android system of a layered architecture is used as an example to describe the software structure of the electronic device 100.

Figure 2:
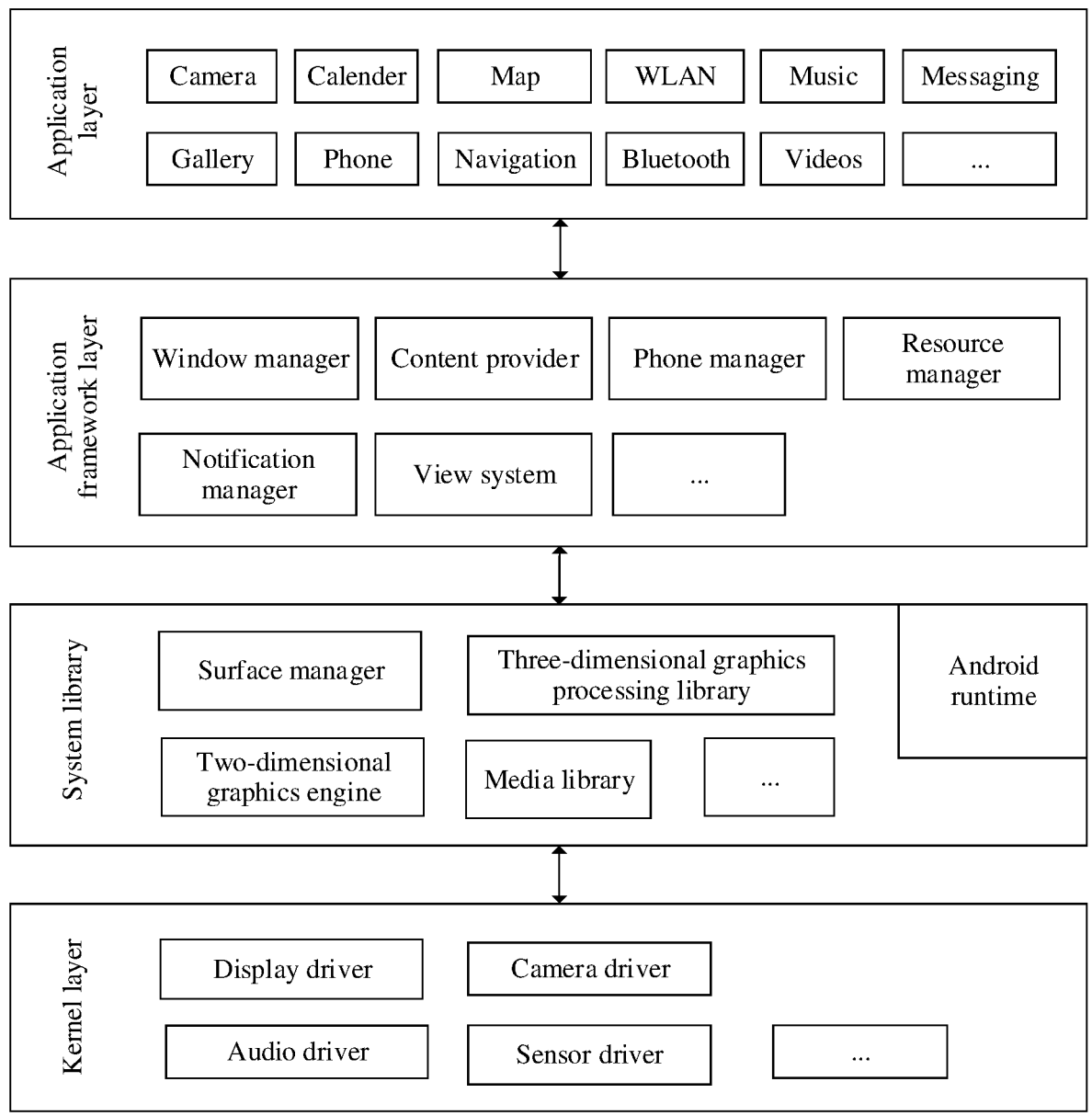
FIG. 2 is an architectural diagram of a software system of an electronic device according to an embodiment of the present disclosure.

FIG. 2 is a block diagram of a software structure of the electronic device 100 according to an embodiment of the present disclosure.

In a layered architecture, software is divided into several layers, and each layer has a clear role and task. The layers communicate with each other through a software interface. In some embodiments, the Android system is divided into four layers: an application layer, an application framework layer, an Android runtime and a system library, and a kernel layer from top to bottom.

The application layer may include a series of application packages. As shown in FIG. 2, the application packages may include applications such as Camera, Gallery, Calendar, Phone, Map, Navigation, WLAN, Bluetooth, Music, Videos, and Messaging. Embodiments of the present disclosure are mainly implemented by improving a camera application at an application layer, for example, extending a function of a camera by adding a plug-in to the camera.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like. In embodiments of the present disclosure, a camera program at the application framework layer may be improved by using the application framework layer, so that when during photographing of a photographed object, a special effect image or a special effect video of a moving trajectory of a target object may be displayed on the display 194. The special effect image or the special effect video is synthesized by the electronic device through real-time calculation and processing in a background.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application program.

The notification manager enables an application to display notification information in a status bar, and may be configured to convey a notification message. The notification manager may automatically disappear after a short pause without requiring user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software, and may also be referred to as a driver layer. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the camera 193.

In embodiments of the present disclosure, in a process in which a user takes a photo with the electronic device, when a static image or a video is captured by using the camera 193, the captured image or video may be temporarily stored in the content provider. When a photographing operation is performed, a photographed photo or video may be displayed by using the view system. In embodiments of the present disclosure, before an image is displayed, fusion and image cropping further need to be performed on a plurality of frames of images, and then the image is displayed on a preview interface by using the view system.

All technical solutions in the following implementations may be implemented in the electronic device 100 that has the foregoing hardware architecture and software architecture. In the following implementations of the present disclosure, an example in which the electronic device 100 is a mobile phone is used to describe in detail the technical solutions provided in embodiments of the present disclosure with reference to the accompanying drawings.

For example, a user may indicate, by touching a specific control on a screen of the mobile phone, pressing a specific physical button or a button combination, entering a voice instruction, or making an air gesture, the mobile phone to start a camera application. In response to an instruction of starting the camera application by the user, the mobile phone starts a camera and displays a photographing screen, as shown in FIG. 3A and FIG. 3B.

For example, the user may tap an application icon "Camera" on a desktop of the mobile phone to indicate the mobile phone to start the camera application, and the mobile phone displays the photographing screen. Alternatively, when the mobile phone is in a screen-locked state, the user may indicate, by using a right-swipe gesture or an up-swipe gesture on the screen of the mobile phone, the mobile phone to start the camera application, and the mobile phone displays the photographing screen. In another example, when the mobile phone is in the screen-locked state, the user may tap a shortcut icon of an application "Camera" on a lock screen interface, to indicate the mobile phone to start the camera application, and the mobile phone may display the photographing screen. In still another example, when the mobile phone is running another application, the user may tap a control of a camera function to enable the mobile phone to start the camera application to perform photographing.

Figure 3A:
FIG. 3A and FIG. 3B are a schematic diagram of a photographing scene for intelligent framing recommendation according to an embodiment of the present disclosure.
Figure 3B:
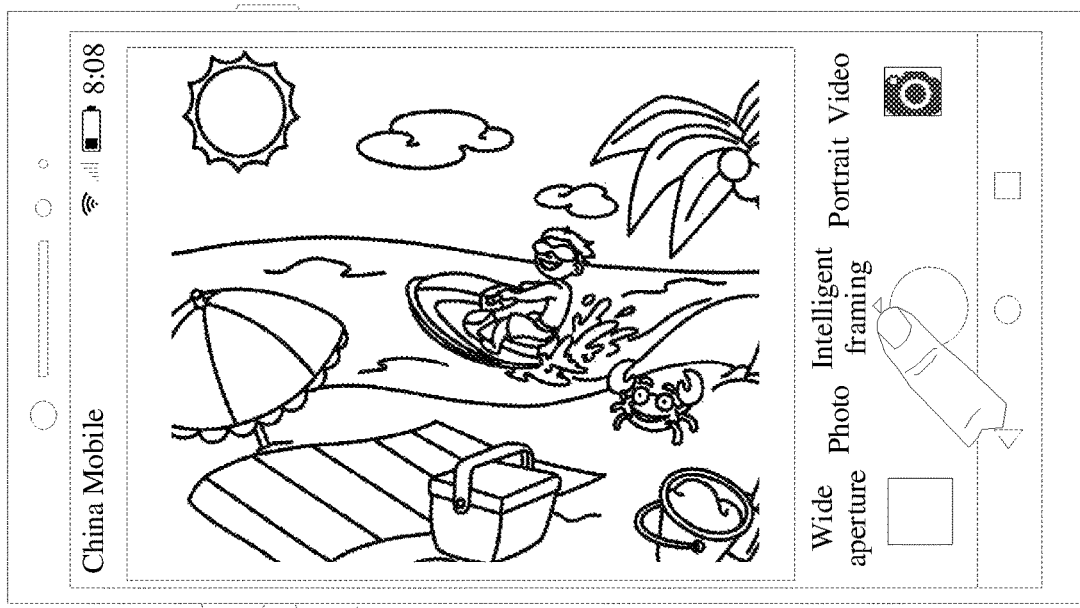

As shown in FIG. 3A and FIG. 3B, the photographing screen of the camera usually includes a real-time image preview frame, a photographing control, and another functional control, for example, may include "Wide aperture", "Portrait", "Photo", or "Video". The real-time image preview frame may be used to preview a real-time image captured by the camera. The user may determine, based on the image in the real-time image preview frame, an occasion for indicating the mobile phone to perform a photographing operation, to generate a target image. An operation of indicating the mobile phone by the user to perform the photographing operation may be, for example, an operation of tapping the photographing control by the user, or an operation of pressing a volume button by the user. In some embodiments, the photographing screen may further include a zoom ratio indication. Generally, a default zoom ratio of the mobile phone is a basic zoom ratio, and is "1×".

The zoom ratio may be understood as a zoom-out/zoom-in ratio of a focal length of a current camera to a reference focal length. The reference focal length is generally a focal length of a main camera of the mobile phone.

An example in which the mobile phone is equipped with a short-focus (wide-angle) camera, a medium-focus camera, and a long-focus camera is used for description. When relative positions of the mobile phone and a to-be-photographed object remain unchanged, the short-focus (wide-angle) camera has the smallest focal length and the largest field of view (FoV), and corresponds to the smallest size of an object in a photographed image. A focal length of the medium-focus camera is larger than that of the short-focus (wide-angle) camera, a field of view of the medium-focus camera is smaller than that of the short-focus (wide-angle) camera, and a size of an object in a photographed image of the medium-focus camera is larger than that of the short-focus (wide-angle) camera. The long-focus camera has the largest focal length and the smallest field of view, and corresponds to the largest size of an object in a photographed image. For different framing areas, the mobile phone may intelligently select different camera combinations to ensure imaging quality and composition effects.

The field of view is an angle formed in an optical instrument with a lens of the optical instrument as a vertex and two edges of a maximum range in which an object image of a measured target can pass through the lens. The field of view indicates a maximum angle range that can be photographed by the camera in a process of photographing an image by the mobile phone. In other words, if a to-be-photographed object is within this angle range, the to-be-photographed object is captured by the mobile phone. If a to-be-photographed object is not within this angle range, the to-be-photographed object is not captured by the mobile phone. Generally, when a camera has a larger field of view, the camera has a larger photographing range. When a camera has a smaller field of view, the camera has a smaller photographing range.

In other words, the field of view determines a view range of the optical instrument. When the field of view is larger, the view range is larger and optical power is smaller. When classified according to a field of view, cameras may include the following types. (1) Standard camera: A standard camera has a field of view of about 45 degrees, is widely used, and may also be referred to as a medium-focus camera. Generally, a user uses the medium-focus camera for most scenes. Therefore, the medium-focus camera may be set as a main camera. The focal length of the main camera is set to the reference focal length, and the zoom ratio is set to "1×". (2) Telephoto camera: A telephoto camera has a field of view within 40 degrees, may be used for photographing at a long distance, and may be used as a long-focus lens in an electronic device to complete photographing of a long-distance object. (3) Wide-angle camera: A wide-angle camera has a field of view greater than 60 degrees and may capture images in a large range. However, images near the camera may be distorted. The main camera in the electronic device may be a wide-angle lens whose focal length is within 35 mm. In addition, an ultra-wide-angle lens with a focal length within 24 mm is further included.

In some embodiments, digital zoom (or referred to as digital zoom) may be performed on an image captured by the main camera, that is, each pixel area of a "1×" image captured by the main camera is enlarged by using an ISP or another processor in the mobile phone, and a framing range of the image is correspondingly reduced, so that a processed image is equivalent to an image photographed by using the main camera at another zoom ratio (for example, "2×").

Similarly, a ratio of the focal length of the long-focus camera to the focal length of the main camera may be used as a zoom ratio of the long-focus camera. For example, the focal length of the long-focus camera may be 5 times the focal length of the main camera, that is, the zoom ratio of the long-focus camera is "5×".

Similarly, a ratio of the focal length of the short-focus (wide-angle) camera to the focal length of the main camera may be used as a zoom ratio of the short-focus (wide-angle) camera. For example, the focal length of the short-focus camera may be 0.5× or 0.6× of the focal length of the main camera, that is, the zoom ratio of the wide-angle camera is "0.5×" or "0.6×".

It should be noted that the mobile phone may use any one of the foregoing cameras as the main camera, and use the focal length of the main camera as the reference focal length. A multiple of a focal length of another auxiliary camera and a focal length of the main camera may be used as a zoom ratio of the auxiliary camera. This is not specifically limited in the present disclosure.

In some embodiments, the user may perform manual zoom to adjust a zoom ratio used during photographing of the mobile phone. For example, as shown in FIG. 3A and FIG. 3B, the user may adjust, by operating a zoom ratio indication on the photographing screen, the zoom ratio used by the mobile phone. For example, when a zoom ratio currently used by the mobile phone is "1×", the user may tap the zoom ratio indication once or a plurality of times, so that the zoom ratio used by the mobile phone is changed to "5×", and the real-time image preview frame of the mobile phone displays a target photographing image with a zoom of 5×. Alternatively, the user may further reduce, by using a gesture of pinching two fingers (or three fingers) on the photographing screen, a zoom ratio used by the mobile phone. For example, the zoom ratio is updated to "0.8×". Alternatively, a gesture of swiping two fingers (or three fingers) outward (in a direction opposite to a direction of pinching) increases a zoom ratio used by the mobile phone. For example, the zoom ratio is updated to "4×". Alternatively, the user may further perform manual zooming in a manner such as dragging a zoom ruler on the photographing screen to change a zoom ratio used by the mobile phone.

In embodiments of the present disclosure, in a process in which the user takes a photo with the electronic device, a plurality of matching framing recommendation frames are recommended to the user for different fields of view corresponding to a plurality of cameras by using a multi-camera intelligent framing recommendation solution, for example, by using an ultra-wide-angle camera, a lens combined with an ultra-wide-angle camera and a wide-angle camera, or a lens combined with a wide-angle camera and a long-focus lens. In addition, the electronic device interacts with the user to perform framing selection, to switch, to an image preview interface in real time, a framed image obtained after multi-camera image fusion and cropping, to generate a final target image, present a WYSIWYG composition framing solution to the user, and intelligently enrich composition recommendations for the user, thereby effectively improving photographing quality.

Figure 4:
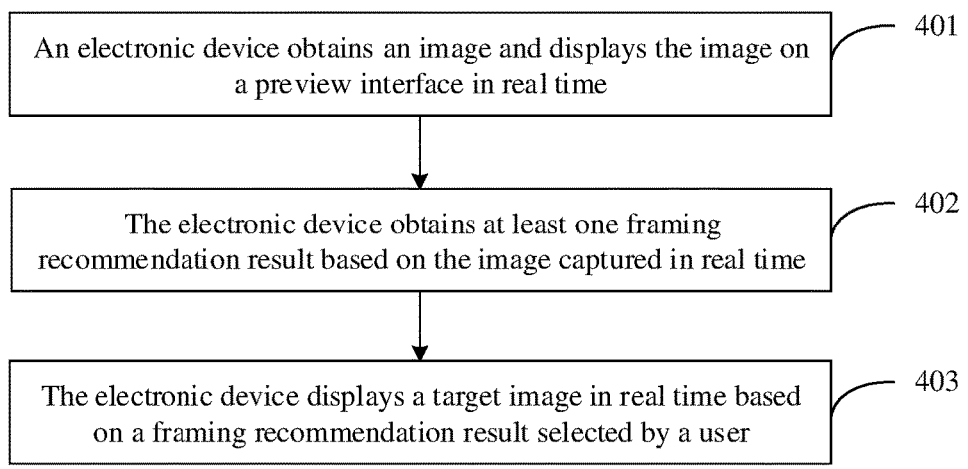
FIG. 4 is a schematic flowchart of a photographing method for intelligent framing recommendation according to an embodiment of the present disclosure.

Based on the foregoing hardware and software in embodiments of the present disclosure, with reference to the foregoing photographing scene, embodiments of the present disclosure are described below in detail with reference to corresponding accompanying drawings. As shown in FIG. 4, the method may include the following steps.

401: An electronic device obtains an image and displays the image on a preview interface in real time.

The electronic device receives an instruction of starting a camera application by a user to perform photographing, and displays, in real time on an image preview interface on a display according to an image captured by a camera.

With reference to the foregoing photographing scene of the electronic device, the electronic device receives a first operation of the user. For example, the first operation may be an operation such as tapping, by the user, a "Camera" icon on a desktop of a mobile phone, or swiping, by the user, a screen of the mobile phone to open a "Camera" application in a shortcut manner when the mobile phone is in a screen-locked state.

The image captured by the camera includes the foregoing image captured by one camera or an image captured by a plurality of cameras jointly. For example, the image captured by the camera may be an image captured by an ultra-wide-angle camera, or the image captured by the camera may be an image jointly captured by a wide-angle camera and a long-focus camera, that is, an image obtained after image fusion is performed on images captured by two cameras with different focal lengths.

It should be noted that, in a specific photographing scene, the electronic device may automatically select an appropriate camera based on a focal section to which a target photographing object belongs, or the user manually switches between cameras according to a framing requirement. For a specific lens selection policy, refer to related technical descriptions. This is not specifically limited in the present disclosure.

As shown in FIG. 3A and FIG. 3B, the user may tap an "Intelligent framing" control in an interface of the camera application to enable an intelligent framing recommendation mode provided in the present disclosure, or otherwise the electronic device performs conventional manual framing and photographing.

Image fusion refers to a technology of comprehensively processing a plurality of images into a new image by using a specific algorithm.

In embodiments of the present disclosure, image fusion means that the electronic device performs image fusion on images, that is, images with large and small FoVs, that are simultaneously captured by at least two cameras with different focal lengths. For a specific image fusion process and a related algorithm, refer to an existing related technology. A possible image fusion process is described below by using an example, and does not constitute a special limitation on an image fusion technology.

First, the electronic device may perform pixel-level registration on an image with a large FoV and an image with a small FoV by using an image registration algorithm, for example, feature point detection and matching of a speed up robust feature (Surf).

Then, the electronic device may adjust parameters of a gamma curve, a color correction matrix (CCM), and a color lookup table (3D LUT), and perform color and brightness correction on the image with a large FoV by using the image with a small FOV as a reference.

Optionally, the electronic device may further perform sharpening and detail enhancement on the image with a large FoV by using an image super-resolution algorithm.

Finally, the electronic device processes, by using an image fusion algorithm, the image obtained in the foregoing processing process, to obtain a fused image. For example, the image fusion algorithm may be a Laplacian pyramid fusion algorithm.

A result obtained through image fusion can use spatial correlation of a plurality of images and complementarity of image information, so that an image obtained after fusion has a more comprehensive and clear expression of a photographing scene.

402: The electronic device obtains at least one framing recommendation result based on the image captured in real time.

In response to the first operation of the user, the electronic device obtains at least one framing recommendation result based on the image captured by the camera.

The framing recommendation result includes a framing recommendation frame, and indicates a framing recommendation effect that is of image photographing and that is provided by the electronic device to the user, so that the user can complete photo photographing based on a composition recommendation solution indicated by the framing recommendation frame.

Figure 5:
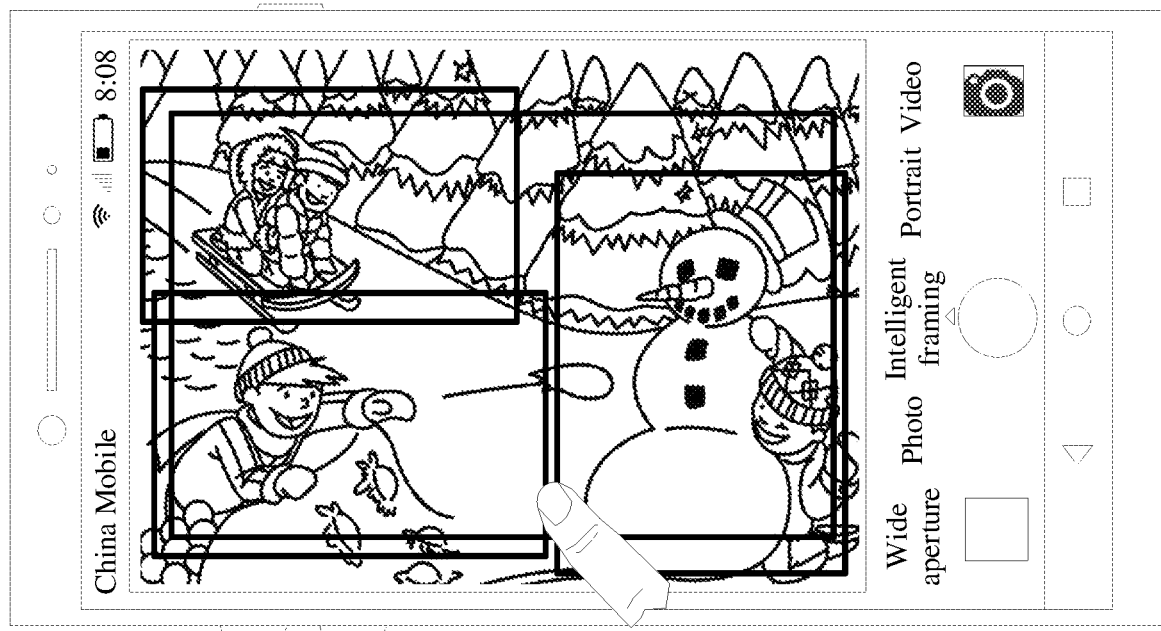
FIG. 5 is a schematic interface diagram of a photographing method for intelligent framing recommendation according to an embodiment of the present disclosure.

As shown in FIG. 5, one or more framing recommendation frames may be displayed on a real-time image preview interface of the electronic device, and each framing recommendation frame indicates a framing recommendation effect of image photographing.

In other words, the framing recommendation frame is a cropping frame, and indicates an effect of cropping based on a current preview image.

In an implementation, to help the user intuitively obtain a framing recommendation effect, the framing recommendation frame may be displayed as a red frame, to increase the user's attention to framing recommendation. The user may tap to determine one of the framing recommendation frames, to indicate the electronic device to perform image cropping based on the framing recommendation frame, to obtain a target image.

In an implementation, the electronic device may display an optimal framing recommendation frame for the user, or the electronic device may simultaneously display a plurality of framing recommendation frames of different sizes for the user on the real-time image preview interface, to indicate the user to select and switch between framing recommendations.

As shown in FIG. 5, the framing recommendation frame may be a landscape framing recommendation frame, and is used to recommend the user to perform landscape photographing; or the framing recommendation frame may be a portrait framing recommendation frame, and is used to recommend the user to perform portrait photographing.

In an implementation, the framing recommendation result may further include a thumbnail corresponding to the framing recommendation frame, and the thumbnail is a thumbnail of an image obtained through cropping, based on the framing recommendation frame, the images captured by the at least two cameras.

Figure 6:
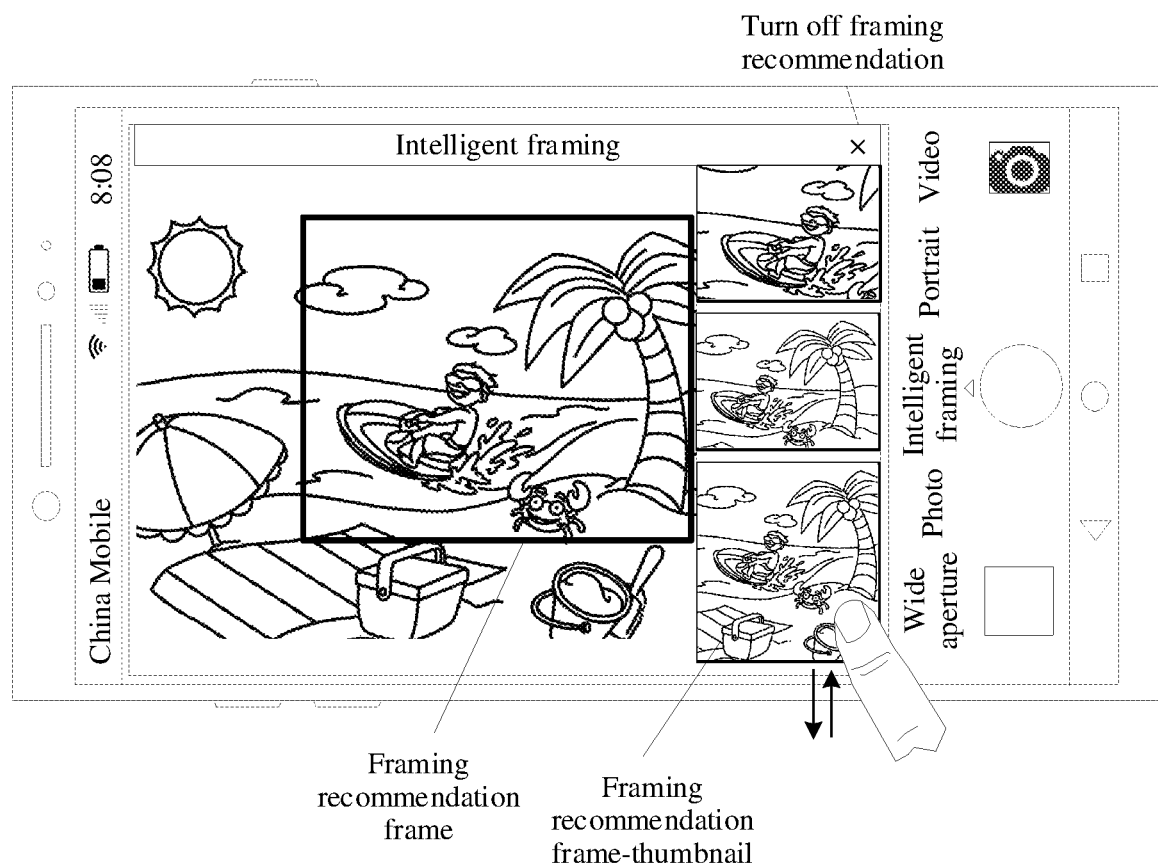
FIG. 6 is a schematic interface diagram of another photographing method for intelligent framing recommendation according to an embodiment of the present disclosure.

For example, as shown in FIG. 6, the electronic device may display thumbnails corresponding to a plurality of framing recommendation frames below the real-time image preview interface, and each thumbnail corresponds to an image obtained through cropping a captured image based on one framing recommendation frame.

In this case, the electronic device may receive a second operation of determining, by the user, one of the framing recommendation frames from the at least one framing recommendation result, for example, selecting a first framing recommendation frame. The second operation indicates the user to select one of the plurality of framing recommendation frames recommended by the electronic device, and performs framing processing on an image captured by the camera and updates a real-time preview image.

In addition, if the electronic device does not receive the second operation of the user, for example, the user taps an "x" icon displayed in the upper right corner to exit the framing recommendation mode, or the user moves the mobile phone or adjusts a focal length, the electronic device needs to perform framing recommendation on the image captured in real time again.

In an implementation, the framing recommendation result further includes at least one of a horizontal reference line or a vertical reference line, and the horizontal reference line and the vertical reference line may indicate to rotate the images captured by the at least two cameras to obtain the target image.

In this implementation, when the electronic device receives a photographing confirmation operation of the user, for example, a tap on a photographing button on an interface, or a shortcut photographing operation of pressing a volume button or the like, the electronic device may perform processing based on a real-time image on the preview interface and store the real-time image as the target image obtained after photographing. The target image may be obtained by performing rotation correction, by using the horizontal reference line or the vertical reference line in the framing recommendation result, on an image captured by the camera. In this way, according to the image processing solution provided in the present disclosure, the electronic device may automatically obtain an image obtained through horizontal or vertical correction, thereby improving photographing experience of the user.

The electronic device may perform calculation by using a deep learning network, and extract an image feature necessary for composition by detecting and recognizing a target photographing scene, including semantic information, a salient subject, a main line, or the like, and input the captured image and the extracted image feature into a pre-trained composition evaluation network, to obtain a framing recommendation frame, a horizontal reference line, or a vertical reference line.

Step 402 may include the following steps.

Step 1: The electronic device performs scene detection based on the images captured by the at least two cameras, to obtain composition structure information.

In consideration of a common composition method in photographing techniques, the electronic device may first detect an initial image, to obtain composition structure information included in the initial image. For example, the common composition method in the photographing techniques may include 3×3 grid composition, cross composition, triangular composition, rule of thirds composition, diagonal composition, and the like.

The composition structure information may include information such as a structure line, a salient subject (a photographed object), and a convergence point in the image, and the composition structure information may reflect reference position information of composition.

For example, structure lines included in the photographing scene of the user include a sea level, an outer wall of a building, a door frame, and the like. The salient subject included in the photographing scene of the user includes a portrait, a table, a bouquet of flowers, or the like. The convergence point included in the photographing scene of the user includes a part in which lines of a door frame and a table in an image intersect.

For example, the rule of thirds composition in the photographing techniques is used as an example. When the user performs photographing and framing, a photographing angle of a camera may be adjusted to enable a line or a photographed object in an imaged picture to be located at a one-third position of an image, so that the image is balanced and beautiful in visual terms, and subjective experience of the user is good.

In an implementation, the electronic device performs scene detection based on an image captured by the camera, to obtain a photographed object, that is, a target image feature.

The target image feature may be an identified feature based on the target photographing object, for example, a portrait, a building, a tree, a snow mountain, a football, a ship, or a train. Alternatively, the target image feature may be an identified feature based on the target photographing scene, for example, a beach, sunrise, kicking, or splashing. Based on different target image features, the electronic device may match different composition recommendations based on a preconfigured algorithm.

A scene detection algorithm may be a scene detection model trained in advance by using a large amount of image data and corresponding feature labels, for example, a neural network model. A specific algorithm involved in the detection model may include a multi-category scene semantic segmentation algorithm, a semantic line detection algorithm, a salience detection algorithm, a facial analysis algorithm, or the like. Various scene detection algorithms can identify more abundant and comprehensive target image features, to cover a common photographing scene of the user.

Optionally, the electronic device may perform operations such as rotation and deformation on the image based on the structure line, to obtain a preprocessed image.

The electronic device may detect, based on the identified structure line, that a sea level, a building structure line, a door or window frame, or the like included in the image deviates from a horizontal line or a vertical line. The electronic device may perform operations such as rotation and deformation on the image to obtain a preprocessed image, so that the structure line in the preprocessed image is straight or parallel to the horizontal/vertical line, and a problem of a tilt, a skew, or a deformation in a photographed image can be corrected.

Step 2: The electronic device may perform photographing composition calculation on the images captured by the at least two cameras and composition structure information, to obtain the at least one framing recommendation result.

An algorithm for the photographing composition calculation may be an artificial intelligence (AI) algorithm. For example, a framing recommendation model obtained by training a large amount of image data in advance is used for the photographing composition calculation. For example, the electronic device may obtain an optimized framing composition recommendation through calculation based on an inputted initial image (an image captured by a camera) by using a neural network model.

In addition, structural information detected by the electronic device may be used as a priori information of the framing recommendation model, that is, the framing recommendation model may match, based on the structural information, a framing recommendation template that is close to or suitable for composition, so that a result outputted by the framing recommendation model is more robust and interpretable.

In an implementation, the framing recommendation model may include a consistency loss function, which is used to monitor an output result of the framing recommendation model, so that the framing recommendation model can obtain a framing recommendation result with better consistency. That is, results outputted by the framing recommendation model are consistent or similar in a plurality of times of photographing of similar scenes. In addition, results outputted by the framing recommendation model are consistent and do not shake when a same scene or picture is continuously photographed.

For construction of the consistency loss function, refer to an existing related technology. This is not specifically limited in the present disclosure.

Specifically, the foregoing framework of the scene detection model may be used to perform deep learning on a large amount of image data, and with reference to a composition rule and a viewfinder template that are constructed by a professional photographer, deep learning may be further performed on data such as a subjective score of composition beauty and an annotation of coordinates of a viewfinder cropping frame, to obtain the framing recommendation model. In this way, the electronic device may obtain, by using the framing recommendation model and based on an inputted image and a target image feature, framing recommendation results such as a plurality of viewfinder cropping frames with high composition scores, a horizontal reference line, or a vertical reference line.

Common composition rules may include 3×3 grid composition, cross composition, triangular composition, rule of thirds composition, diagonal composition, horizontal line composition, complete portrait composition, visual balance composition, and the like. For details, refer to related technical content. This is not specifically limited in the present disclosure.

By using the foregoing process performed in 402, the electronic device may obtain at least one framing recommendation result, to interact with the user, update the preview interface based on one of the framing recommendation results that is selected by the user, and perform final imaging.

In an implementation, the electronic device may detect, by using the deep learning network, a horizontal line, a vertical line, a building central axis, and the like that are visually salient in the captured image, to determine, based on an actual horizontal reference line or vertical reference line, whether a skew occurs in an image photographed by the user, and obtain, through calculation, an angle at which rotation correction needs to be performed on the image.

Figure 7:
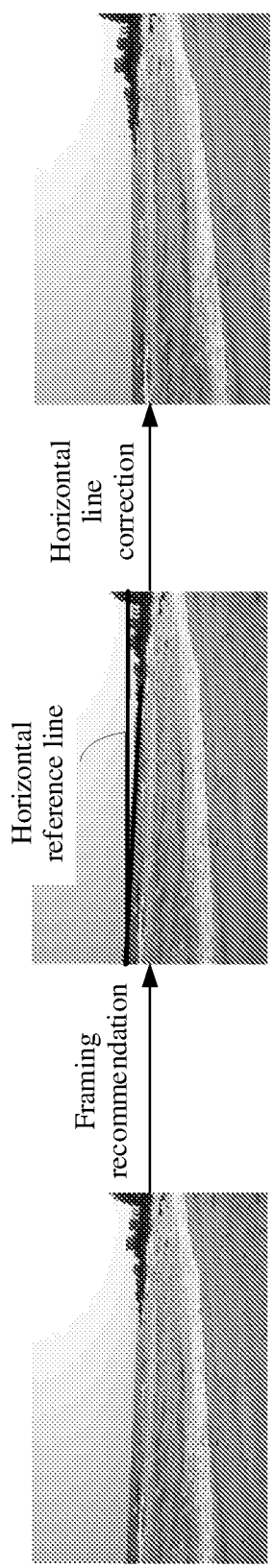
FIG. 7 is a schematic flowchart and an effect diagram of a photographing method for intelligent framing recommendation according to an embodiment of the present disclosure.

For example, as shown in FIG. 7, the framing recommendation result may include a horizontal reference line, used for indicating that an angle deviation exists between a sea level photographed by the user and an actual horizontal reference line, so that after receiving a photographing instruction of the user, the electronic device may automatically rotate a currently captured image based on the horizontal reference line, to obtain the target image. Alternatively, the user may adjust the photographing angle based on the horizontal reference line indicated by the electronic device. For example, the user moves or rotates the electronic device, so that the sea level photographed by the user is flush with or basically flush with the indicated horizontal reference line.

When the camera is not moved and manual zoom is not performed, the user may tap to select one of the framing recommendation frames, and a preview interface of a camera of the electronic device is updated to a target image corresponding to the framing recommendation frame.

In addition, after the preview interface of the electronic device displays a framing cropping result, the electronic device needs to enable a preview stabilization function, to ensure that a preview image seen by the user is displayed stably without obvious shaking.

403: The electronic device displays a target image in real time based on a framing recommendation result selected by a user.

In response to the second operation of the user, the electronic device may process, based on the framing recommendation result selected by the user, the image captured by the camera, to obtain the target image, and update and display a real-time preview interface.

The target image is an image obtained through cropping, based on the framing recommendation result, the images captured by the at least two cameras. Alternatively, the target image may be an image obtained by performing, based on the framing recommendation result, cropping and rotation on the image captured by the at least one camera.

In this case, the electronic device may receive the photographing confirmation operation of the user. To be specific, the user may trigger, based on the target image displayed in real time on the preview interface and by tapping a "Photograph" button or icon or in a shortcut photographing manner of touching a volume button of the electronic device or the like, the electronic device to perform photographing, to store the target image in the electronic device.

In addition, if the electronic device does not receive the photographing confirmation operation of the user, for example, the user taps an "x" icon displayed in the upper right corner to exit the framing recommendation mode, or the user moves the mobile phone or adjusts a focal length, the electronic device needs to perform framing recommendation on the image captured in real time again.

In an implementation, the image captured by the camera includes an image obtained after image fusion is performed on images captured by the at least two cameras with different focal lengths, and the target image is an image obtained after image fusion is performed on the images captured by the at least two cameras with different focal lengths based on the framing recommendation result and cropping is performed.

In an implementation, to ensure final imaging quality, a specific range may be set for sizes of the plurality of framing recommendation frames obtained in step 402. In other words, the sizes of the framing recommendation frames may not be greater than a first threshold, and the sizes of the framing recommendation frames may not be less than a second threshold. An upper limit of the sizes of the framing recommendation frames is the first threshold. The first threshold may be set based on an imaging range corresponding to a camera with a large field of view in the plurality of cameras for joint imaging. A lower limit of the sizes of the framing recommendation frames is the second threshold. The second threshold is set based on an imaging range corresponding to a camera with a small field of view in the plurality of cameras for joint imaging.

Joint imaging of the plurality of cameras is limited by an imaging range corresponding to a camera with a large field of view (a short focal length). In addition, in consideration of that a distorted edge image captured by a camera with a large field of view needs to be cropped during image fusion, the first threshold is generally set to be less than an imaging range corresponding to a camera with a large field of view (a short focal length).

For example, if a zoom ratio of the ultra-wide-angle camera equipped on the electronic device is "0.6×", the first threshold $A=A0-A1$, where an imaging range corresponding to the ultra-wide-angle camera whose zoom ratio is "0.6×" is represented as A0, and a distorted edge image region is represented as A1×.

The following two aspects need to be considered in the setting of the second threshold.

1. The second threshold is set based on an imaging range corresponding to the upper limit of the zoom ratios of the at least two cameras of the electronic device, that is, the second threshold should be less than or equal to an imaging range corresponding to a maximum zoom ratio.

For example, if the upper limit of the zoom ratio of the long-focus camera equipped on the electronic device is "10×", the second threshold $B \leq B0$, where an imaging range corresponding to the long-focus camera whose zoom ratio is "10×" is represented as B0.

2. The second threshold is set based on an imaging range corresponding to a zoom ratio of a camera currently selected by the electronic device, to keep the second threshold from being set to an excessively small value. If the second threshold is set to an excessively small value, an obtained framing recommendation frame is far smaller than the imaging range corresponding to the current camera, and as a result the user feels abruptness or has poor experience.

For example, the second threshold is set to ¼ times the imaging range corresponding to the current camera, that is, $B=¼ *B1$, where B1 is the imaging range corresponding to the current camera of the electronic device.

Several cases in which the electronic device obtains a plurality of framing recommendation frames based on different camera imaging are described below with reference to different photographing scenes.

Example 1: If the electronic device currently detects that the target photographing object is in a long-focus section, the electronic device may automatically switch to performing joint imaging by using the long-focus camera and the wide-angle camera or performing joint imaging by using the long-focus camera and the ultra-wide-angle camera.

The long-focus camera corresponds to a small field of view, and a focal length of the long-focus camera may be N times a focal length of a main camera, where N is greater than 1. For example, a zoom ratio of the long-focus camera may be "2×" or "5×". According to the foregoing impact of the field of view of the camera on imaging, the long-focus camera may be configured to complete photographing of a long-distance object. The wide-angle camera or the ultra-wide-angle camera corresponds to a large field of view. A focal length of the wide-angle camera or the ultra-wide-angle camera may be M times the focal length of the main camera, where M is less than or equal to 1. For example, a zoom ratio of the wide-angle camera or the ultra-wide-angle camera may be "0.5×" or "0.6×". For example, the main camera may be the wide-angle camera. In this case, M=1. According to the impact of the foregoing field of view of the camera on imaging, the wide-angle camera may be configured to provide an image that covers a large framing range.

Therefore, in consideration of a limitation of the field of view of the captured image of the electronic device, the first threshold may be set to a cropping frame of an imaging range corresponding to the ultra-wide-angle camera, or may be set to a cropping frame of an imaging range corresponding to the ultra-wide-angle camera minus a distorted edge area, or may be set to a cropping frame smaller than or equal to an imaging range corresponding to the wide-angle camera. For example, the viewfinder cropping frame is set to an imaging range corresponding to a zoom ratio "0.6×".

In addition, a viewfinder frame that is not constrained may cause low image quality. For example, for photographing with the main camera as the wide-angle camera, a viewfinder frame with a zoom size of "5×" is recommended in the framing recommendation result, which causes very low image quality of an image that is cropped based on recommended framing. In consideration of the image super-resolution algorithm of the electronic device, the second threshold may be set to the cropping frame of the imaging range corresponding to the long-focus camera, or may be set to a cropping frame larger than the imaging range corresponding to the long-focus camera, for example, set to a viewfinder cropping frame of a zoom size "2×".

Figure 8:
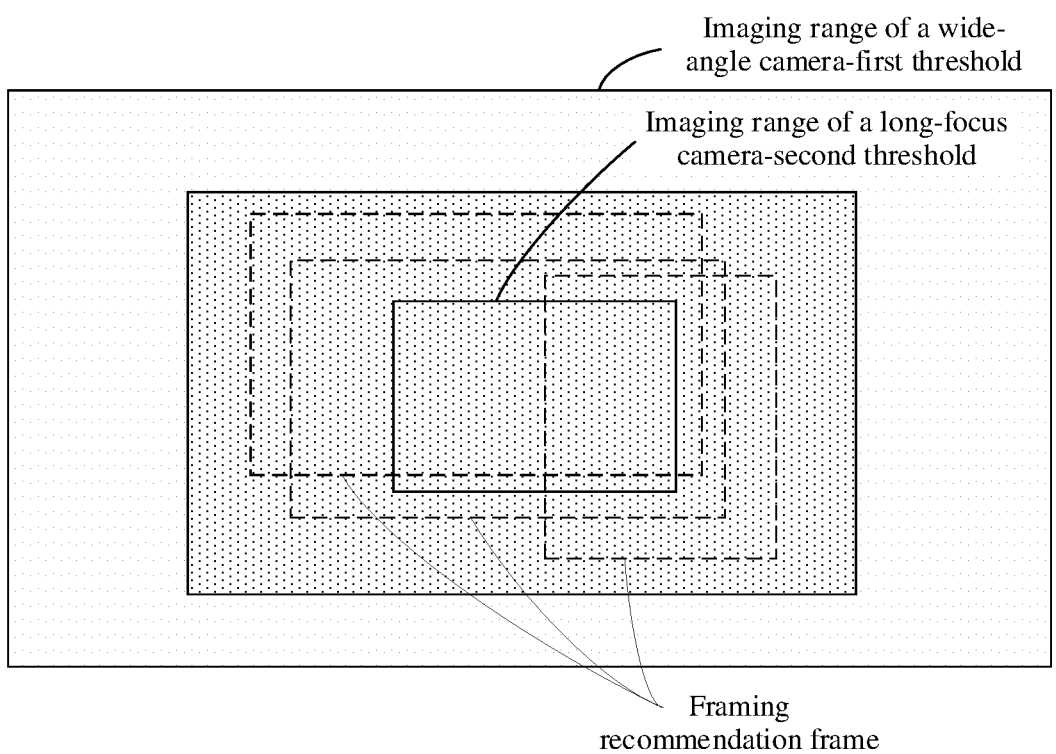
FIG. 8, FIG. 9 and FIG. 10 are schematic diagrams 1 to 3 of a viewfinder frame in a photographing method for intelligent framing recommendation according to an embodiment of the present disclosure.

For example, as shown in FIG. 8, several different framing recommendation frames shown in FIG. 8 may be correspondingly included in the long-focus section. The largest framing recommendation frame, that is, the first threshold, may be the imaging range corresponding to the wide-angle camera, and the smallest framing recommendation frame, that is, the second threshold, may be the cropping frame of the imaging range corresponding to the long-focus camera. FIG. 8 shows several framing recommendation cropping frames between the first threshold and the second threshold. As shown in FIG. 8, in a landscape photographing mode, the electronic device may recommend a portrait framing recommendation frame to the user according to a framing recommendation algorithm.

Therefore, during photographing in the long-focus section, the target image obtained by the electronic device in step 403 may be an image obtained after image fusion is performed on the images separately obtained based on the wide-angle camera and the long-focus camera. Compared with imaging quality with the use of only the long-focus camera, imaging quality of the joint imaging of the long-focus camera and the wide-angle camera is significantly improved. In addition, when the electronic device is further equipped with a wide-angle black-and-white camera, the target image obtained by the electronic device may be an image obtained after image fusion is performed on the images separately obtained based on the wide-angle black-and-white camera, the wide-angle camera, and the long-focus camera. The wide-angle black-and-white camera can be used to improve image details.

Example 2: If the electronic device currently detects that the target photographing object is in a wide-angle focal section, the electronic device may automatically switch to using the wide-angle camera and the ultra-wide-angle camera for joint imaging.

Figure 9:
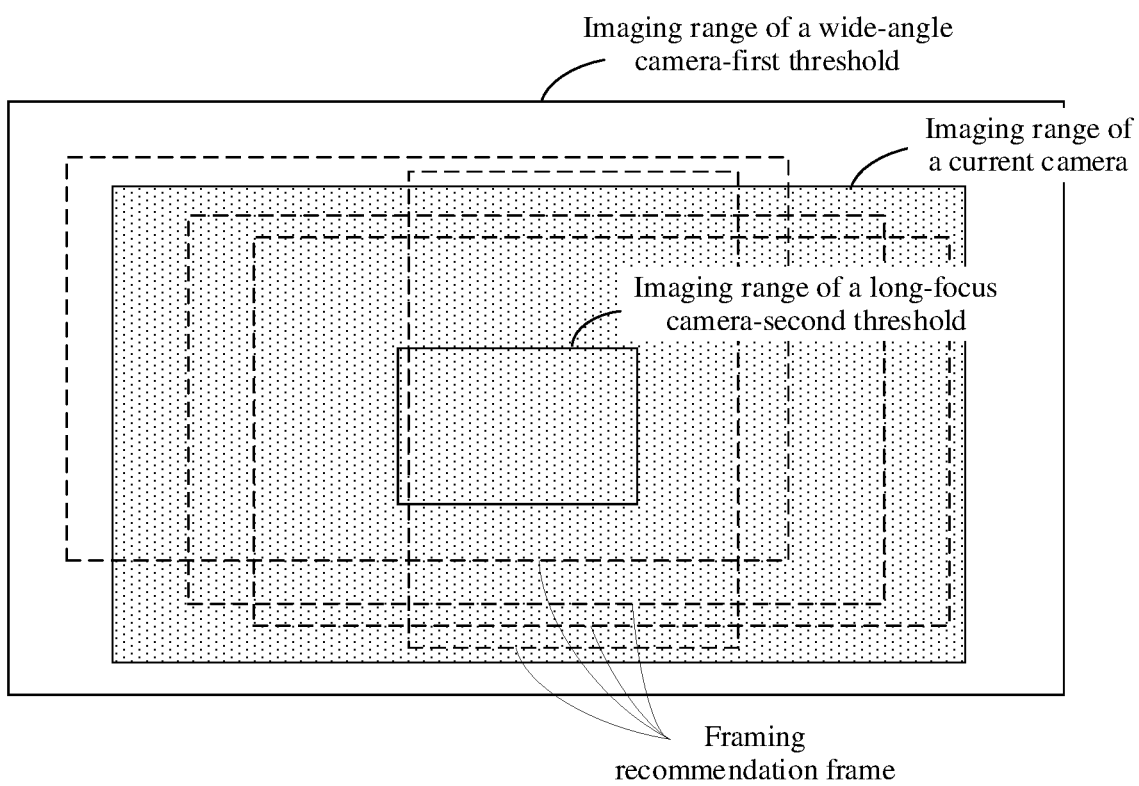

For example, as shown in FIG. 9, several different framing recommendation frames shown in FIG. 9 may be correspondingly included in the wide-angle focal section. The largest framing recommendation frame, that is, the first threshold, may be the imaging range corresponding to the wide-angle camera, and the smallest framing recommendation frame, that is, the second threshold, is the imaging range corresponding to the long-focus camera. FIG. 9 shows several framing recommendation cropping frames between the first threshold and the second threshold, which may also include a portrait framing recommendation frame.

Example 3: If the electronic device currently detects that the target photographing object is in an ultra-wide-angle focal section, the electronic device may automatically switch to using the ultra-wide-angle camera for imaging.

Figure 10:
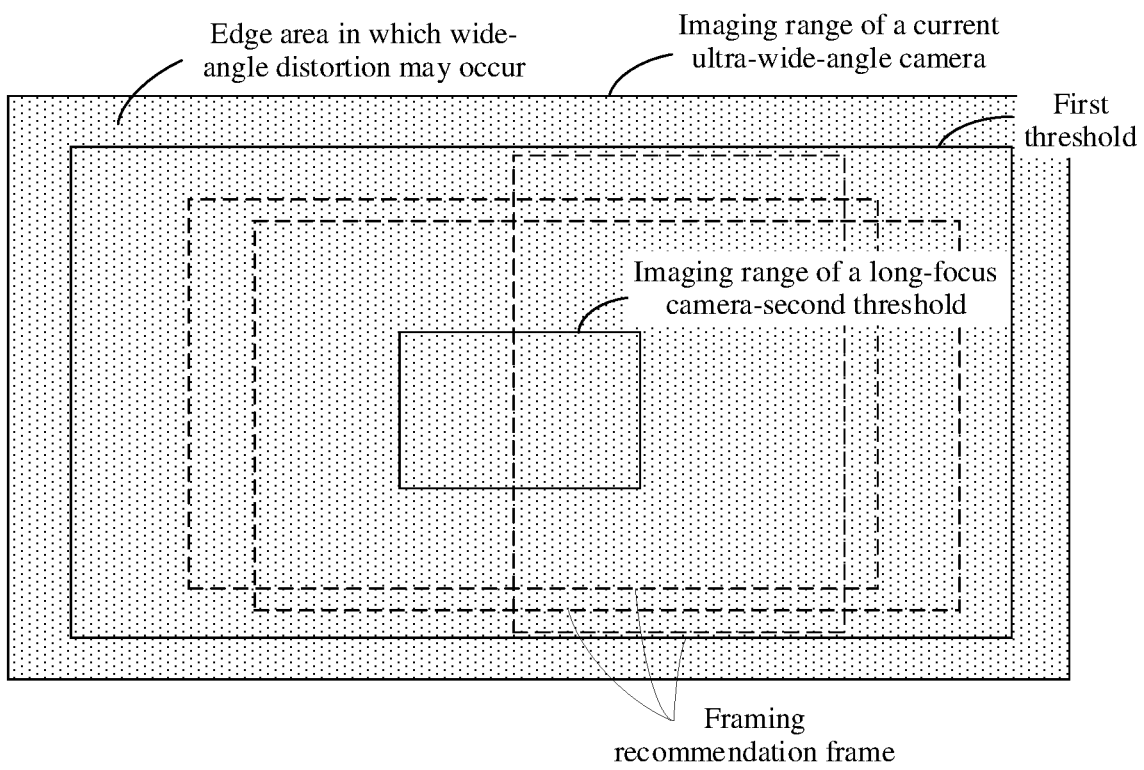

For example, as shown in FIG. 10, several different framing recommendation frames shown in FIG. 10 may be correspondingly included in the ultra-wide-angle focal section. In consideration of the upper limit of the image super-resolution algorithm and in consideration of that an image distortion problem may exist in a boundary area of an image captured by the ultra-wide-angle camera, the framing recommendation frame should not cover areas at four corners of the image as much as possible. The largest framing recommendation frame, that is, the first threshold, may be the imaging range corresponding to the ultra-wide-angle camera with a cropping frame corresponding to an edge area that may be distorted cropped. In addition, the smallest framing recommendation frame, that is, the second threshold, may be an imaging range corresponding to the long-focus camera. FIG. 10 shows several framing recommendation cropping frames between the first threshold and the second threshold, which may also include a portrait framing recommendation frame.

In the foregoing implementations of the present disclosure, deep learning is performed on joint imaging of a plurality of cameras to obtain a framing recommendation result, so that the electronic device may crop or rotate, based on the framing recommendation result, images jointly captured by the plurality of cameras, to obtain more optimized composition and a more optimized framing field of view, thereby improving image photographing quality of the electronic device and improving photographing experience of a user.

In an implementation, the electronic device obtains at least one framing recommendation result. As shown in FIG. 6, when one or more framing recommendation frames may be displayed on the real-time image preview interface of the electronic device, the user may select any one of the framing recommendation frames by performing a tap operation, to update a real-time preview image, or the user may view, by using a swipe gesture, thumbnails corresponding to more framing recommendation frames. Alternatively, the user may tap an "x" icon displayed on the top of a page to exit the framing recommendation mode, or the user may move the electronic device or manually perform zoom, so that the electronic device updates a current preview image and obtains different framing recommendation results through recalculation.

Further, the electronic device may capture a selection of the user on the framing recommendation results, use the selection as preference information of the user, and feed back the selection to a model of the foregoing photographing composition calculation, so that the electronic device performs personalized model training according to the preference information of the user, that is, the user selection is used as a reference input for updating the personalized preference of the user. Subsequently, when performing intelligent framing recommendation, the electronic device may output and sort the framing recommendation results with reference to the preference information of the user.

In addition, the electronic device may further set an intelligent framing model according to the personalized preference of the user. For example, in camera settings, the user may set a preferred photographing mode, for example, "Wide-angle photographing" or "Long-focus photographing", "Scenic photographing", or "Person photographing". Therefore, the electronic device may optimize and update calculation of the intelligent framing model according to personalized preference settings of the user.

Figure 11:
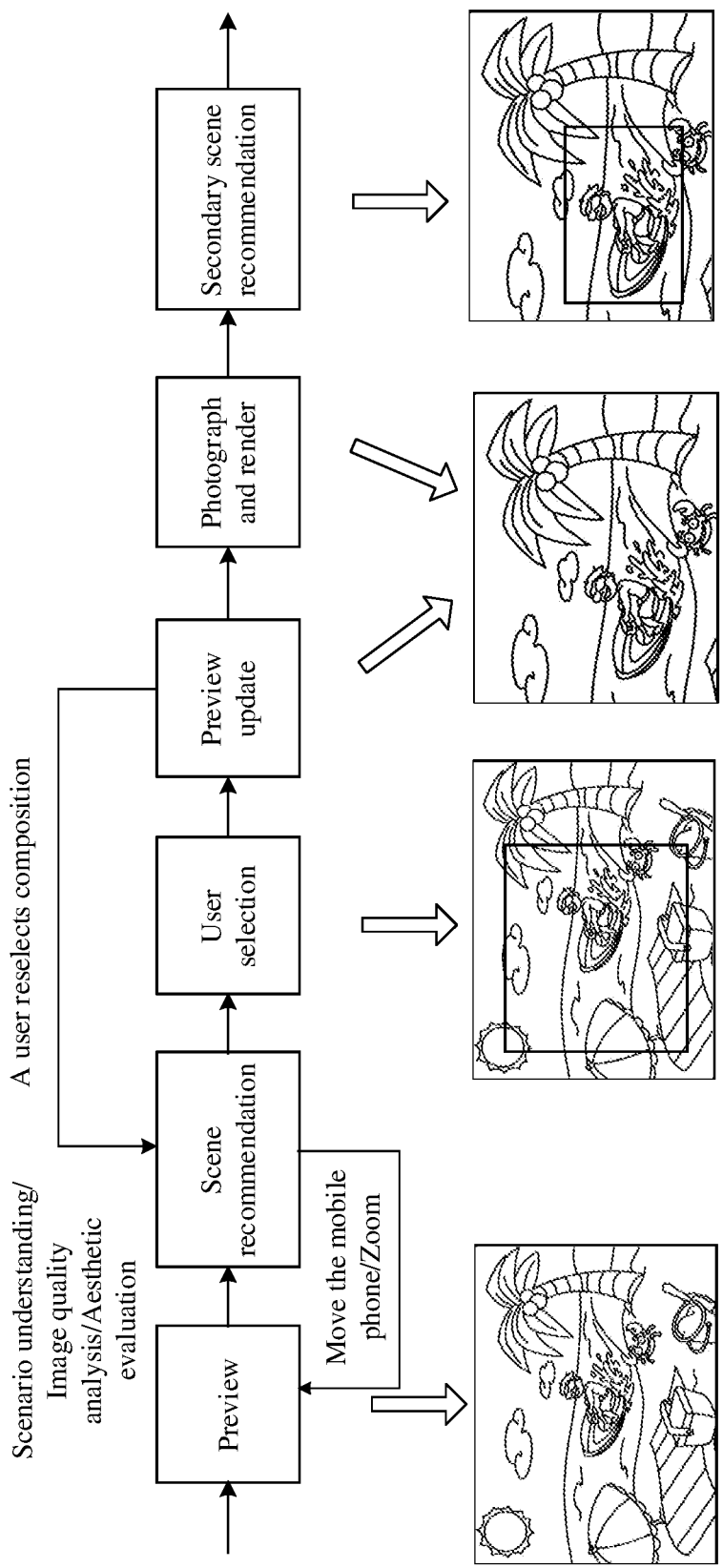
FIG. 11 is a schematic flowchart of another photographing method for intelligent framing recommendation according to an embodiment of the present disclosure.

In addition, in an implementation, the electronic device may further perform secondary framing recommendation for the user. In other words, after obtaining the framing recommendation result for the first time, the electronic device may further obtain at least one framing optimization result based on the target image. The framing optimization result indicates to perform framing optimization on the target image again. After the user taps the photographing button to generate the target image, the electronic device may further perform secondary framing recommendation based on a currently photographed image. For example, as shown in FIG. 11, after the user selects a framing recommendation frame to perform image cropping, the target image is obtained. The electronic device may further perform secondary framing recommendation based on the target image, and the electronic device may further display a new framing recommendation frame by using an image preview interface, to indicate the user to perform image cropping and photographing imaging based on the framing recommendation frame.

In an implementation, the electronic device may store the target image finally obtained through cropping. In addition, the electronic device may separately store, in an album, an image outputted by using an algorithm of the intelligent framing model and images corresponding to a plurality of different cameras, so that when processing an obtained image subsequently, the user may perform a rollback, perform an operation such as post-processing on an original image by using the original image before cropping, or reselecting a framing recommendation result.

In the foregoing possible implementation, the electronic device enriches photographing composition recommendations for the user by interacting with the user, thereby improving photographing experience of the user. In addition, by recording a selection result of the user, the electronic device may further optimize a framing recommendation algorithm, implement personalized customization, and provide richer framing recommendation solutions that fit a use habit of the user for the user, thereby improving photographing experience of the user.

Figure 12:
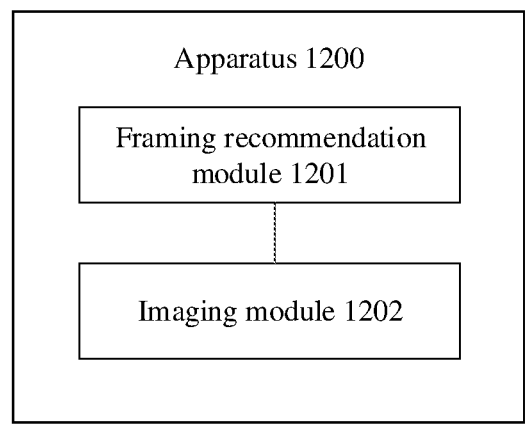
FIG. 12 is a schematic diagram of a structure of another photographing apparatus for intelligent framing recommendation according to an embodiment of the present disclosure.

In the foregoing technical implementation, the present disclosure further provides a photographing apparatus for intelligent framing recommendation. As shown in FIG. 12, an apparatus 1200 includes a framing recommendation module 1201 and an imaging module 1202.

The framing recommendation module 1201 is configured to obtain at least one framing recommendation result based on images captured by the cameras, where the framing recommendation result includes a framing recommendation frame, and the framing recommendation frame indicates a framing recommendation effect of image photographing.

The imaging module 1202 may be configured to display a target image based on a framing recommendation result selected by a user, where the target image is an image obtained through cropping, based on the framing recommendation result, the images captured by the at least two cameras.

In a possible implementation, the framing recommendation result further includes at least one of a horizontal reference line or a vertical reference line, and the horizontal reference line and the vertical reference line indicate to rotate the images captured by the cameras to obtain the target image.

In a possible implementation, the framing recommendation result further includes a thumbnail corresponding to the framing recommendation frame, and the thumbnail is a thumbnail obtained through cropping, based on the framing recommendation frame, the images captured by the cameras.

In a possible implementation, the framing recommendation module 1201 is specifically configured to: perform scene detection based on the images captured by the cameras, to obtain composition structure information; and perform, by using a framing recommendation model, photographing composition calculation on the images captured by the cameras and the composition structure information, to obtain the at least one framing recommendation result.

In a possible implementation, a size of the framing recommendation frame is less than a first threshold and is greater than or equal to a second threshold, the first threshold is set based on an imaging range corresponding to a camera with a large field of view in the plurality of cameras, and the second threshold is set based on an imaging range corresponding to a camera with a small field of view in the plurality of cameras.

In a possible implementation, the apparatus 1200 may be configured to perform steps performed by the electronic device in the foregoing embodiments, for example, steps 401 to 403 in the foregoing embodiments.

With reference to the schematic diagram of the electronic device shown in FIG. 1, the electronic device may be an image processing apparatus (the electronic device) provided in embodiments of the present disclosure. As shown in FIG. 1, the electronic device 100 includes the processor 110 and the internal memory 121. The processor 110 and the internal memory 121 may communicate with each other through an internal connection path, to transfer a control signal and/or a data signal. The internal memory 121 may be configured to store a computer program. The processor 110 may be configured to invoke the computer program from the internal memory 121 and run the computer program, to perform the steps in the foregoing embodiments to implement image processing.

Specifically, the electronic device 100 may correspond to embodiments of the methods according to embodiments of the present disclosure. In addition, units in the electronic device 100 and the foregoing other operations and/or functions are used to implement corresponding procedures in embodiments of the methods.

The processor 110 may be configured to perform one or more processing actions implemented by the electronic device described in the foregoing method embodiments. For details, refer to the descriptions in the foregoing method embodiments. Details are not described herein again.

It should be understood that, the processor in embodiments of the present disclosure may be a CPU. Alternatively, the processor may be another general-purpose processor, a digital signal processor (DSP), an application-specific integrated circuit (ASIC), a field programmable gate array ( ) or another programmable logic device, a discrete gate or transistor logic device, a discrete hardware component, or the like.

It should be further understood that the memory in embodiments of the present disclosure may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

An embodiment of the present disclosure further provides a computer-readable medium, configured to store a computer program. The computer program includes instructions used to perform the method performed by a network device and a terminal device in the foregoing methods. The readable storage may a ROM or a RAM. This is not limited in embodiments of the present disclosure.

The present disclosure further provides a computer program product. The computer program product includes instructions. When the instructions are executed, the terminal device and the network device are enabled to perform operations corresponding to the terminal device and the network device in the foregoing methods.

Optionally, the computer instructions are stored in a storage unit.

Optionally, the storage unit is a storage unit equipped in an electronic device, for example, a register or a cache. Alternatively, the storage unit may be a storage unit that is in the apparatus and that is located outside a chip, for example, a ROM, another type of static storage device that can store static information and instructions, or a RAM. The processor described above may be a CPU, a microprocessor, an ASIC, or one or more integrated circuits configured to control execution of a program for the feedback information transmission method. The processing unit and the storage unit may be decoupled, are separately disposed on different physical devices, and are connected in a wired or wireless manner to implement functions of the processing unit and the storage unit, to support a system chip in implementing various functions in the foregoing embodiments. Alternatively, the processing unit and the memory may be coupled to a same device. It should be understood that, in embodiments of the present disclosure, the processor may be a CPU, or may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

It may be clearly understood by a person skilled in the art that, for the purpose of convenient and brief description, for a detailed working process of the foregoing module, apparatus, and unit, reference may be made to a corresponding process in the foregoing method embodiments, and details are not described herein again.

It should be understood that sequence numbers of the foregoing processes do not mean execution sequences in embodiments of the present disclosure. The execution sequences of the processes should be determined based on functions and internal logic of the processes, and should not constitute any limitation on implementation processes of embodiments of the present disclosure.

A person of ordinary skill in the art may be aware that, in combination with the examples described in embodiments disclosed in this specification, modules and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

In the several embodiments provided in the present disclosure, it should be understood that the disclosed apparatuses and methods may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The modules described as separate parts may or may not be physically separate, and parts displayed as modules may or may not be physical units, may be located in one position, or may be distributed on a plurality of modules. Some or all of the units may be selected based on actual requirements to achieve the objectives of the solutions of embodiments.

In addition, function modules in embodiments of the present disclosure may be integrated into one processing module, each of the modules may exist alone physically, or two or more modules are integrated into one unit.

When the functions are implemented in the form of a software functional module and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of the present disclosure.

In conclusion, the foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A photographing method for intelligent framing recommendation,
applied to an electronic device equipped with at least two cameras with different focal lengths, wherein the method comprises:
obtaining at least one framing recommendation result based on images captured by the at least two cameras, wherein each of the at least one framing recommendation result comprises a framing recommendation frame indicating a framing recommendation effect of image photographing; and
displaying a target image based on a framing recommendation result selected by a user among the at least one framing recommendation result, wherein the target image is obtained through cropping, based on the selected framing recommendation result, the images captured by the at least two cameras,
wherein a size of the framing recommendation frame in the selected framing recommendation result is less than a first threshold and is greater than or equal to a second threshold, the first threshold is set based on an imaging range corresponding to a camera with a large field of view in the at least two cameras, and the second threshold is set based on an imaging range corresponding to a camera with a small field of view in the at least two cameras.

2. The method according to claim 1, wherein each of the at least one framing recommendation result further comprises at least one of a horizontal reference line or a vertical reference line, and the horizontal reference line and the vertical reference line indicate to rotate the images captured by the at least two cameras to obtain the target image.

3. The method according to claim 1, wherein each of the at least one framing recommendation result further comprises a thumbnail corresponding to the framing recommendation frame in the framing recommendation result, and the thumbnail is a thumbnail obtained through cropping, based on the framing recommendation frame in the framing recommendation result, the images captured by the at least two cameras.

4. The method according to claim 1, wherein the obtaining at least one framing recommendation result based on images captured by the at least two cameras comprises:
performing scene detection based on the images captured by the at least two cameras, to obtain composition structure information; and
performing, by using a framing recommendation model, photographing composition calculation on the images captured by the at least two cameras and the composition structure information, to obtain the at least one framing recommendation result.

5. A photographing method for intelligent framing recommendation, applied to an electronic device equipped with at least two cameras with different focal lengths, wherein the method comprises:
obtaining, in response to a first operation of a user, at least one framing recommendation result based on images captured by the at least two cameras, wherein each of the at least one framing recommendation result comprises a framing recommendation frame indicating a framing recommendation effect of image photographing;
receiving a second operation of the user, wherein the second operation indicates the user to determine a first framing recommendation frame from the at least one framing recommendation result; and
updating, in response to the second operation, a real-time preview image to a target image, wherein the target image is obtained through cropping, based on the first framing recommendation frame, the images captured by the at least two cameras,
wherein a size of the framing recommendation frame in the framing recommendation result is less than a first threshold and is greater than or equal to a second threshold, the first threshold is set based on an imaging range corresponding to a camera with a large field of view in the at least two cameras, and the second threshold is set based on an imaging range corresponding to a camera with a small field of view in the at least two cameras.

6. The method according to claim 5, wherein each of the at least one framing recommendation result further comprises at least one of a horizontal reference line or a vertical reference line, and the horizontal reference line and the vertical reference line indicate to rotate the images captured by the at least two cameras to obtain the target image.

7. The method according to claim 5, wherein each of the at least one framing recommendation result further comprises a thumbnail corresponding to the framing recommendation frame in the framing recommendation result, and the thumbnail is obtained through cropping, based on the framing recommendation frame in the framing recommendation result, the images captured by the at least two cameras.

8. The method according to claim 5, wherein the obtaining at least one framing recommendation result based on images captured by the at least two cameras comprises:
performing scene detection based on the images captured by the at least two cameras, to obtain composition structure information; and
performing, by using a framing recommendation model, photographing composition calculation on the images captured by the at least two cameras and the composition structure information, to obtain the at least one framing recommendation result.

9. The method according to claim 5, wherein after the updating a real-time preview image to a target image, the method further comprises:
separately storing, in response to a photographing confirmation operation of the user, the target image and the images captured by the at least two cameras with different focal lengths.

10. The method according to claim 5, further comprising:
obtaining at least one framing optimization result based on the target image, wherein each of the at least one framing optimization result comprises the first framing recommendation frame, and the framing optimization result indicates to perform framing optimization on the target image again.

11. An electronic device, comprising:
at least two cameras with different focal lengths;
at least one processor; and a memory, configured to store instructions that, when executable by the at least one processor, cause the electronic device to perform operations comprising:

obtaining at least one framing recommendation result based on images captured by the at least two cameras, wherein each of the at least one framing recommendation result comprises a framing recommendation frame, and the framing recommendation frame indicates a framing recommendation effect of image photographing; and displaying a target image based on a framing recommendation result selected by a user among the at least one framing recommendation result, wherein the target image is obtained through cropping, based on the selected framing recommendation result, the images captured by the at least two cameras, wherein a size of the framing recommendation frame in the framing recommendation result is less than a first threshold and is greater than or equal to a second threshold, the first threshold is set based on an imaging range corresponding to a camera with a large field of view in the at least two cameras, and the second threshold is set based on an imaging range corresponding to a camera with a small field of view in the at least two cameras.

12. The electronic device according to claim 11, wherein each of the at least one framing recommendation result further comprises at least one of a horizontal reference line or a vertical reference line, and the horizontal reference line and the vertical reference line indicate to rotate the images captured by the at least two cameras to obtain the target image.

13. The electronic device according to claim 11, wherein each of the at least one framing recommendation result further comprises a thumbnail corresponding to the framing recommendation frame in the framing recommendation result, and the thumbnail is a thumbnail obtained through cropping, based on the framing recommendation frame in the framing recommendation result, the images captured by the at least two cameras.

14. The electronic device according to claim 11, wherein the obtaining at least one framing recommendation result based on images captured by the at least two cameras comprises:

performing scene detection based on the images captured by the at least two cameras, to obtain composition structure information; and performing, by using a framing recommendation model, photographing composition calculation on the images captured by the at least two cameras and the composition structure information, to obtain the at least one framing recommendation result.

15. An electronic device, wherein the electronic device comprises:

at least two cameras with different focal lengths;
at least one processor; and
a memory, configured to store instructions that, when executable by the at least one processor, cause the electronic device to perform operations comprising:

obtaining, in response to a first operation of a user, at least one framing recommendation result based on images captured by the at least two cameras, wherein each of the at least one framing recommendation result comprises a framing recommendation frame, and the framing recommendation frame indicates a framing recommendation effect of image photographing;

receiving a second operation of the user, wherein the second operation indicates the user to determine a first framing recommendation frame from the at least one framing recommendation result; and updating, in response to the second operation, a real-time preview image to a target image, wherein the target image is obtained through cropping, based on the first framing recommendation frame, the images captured by the at least two cameras, wherein a size of the framing recommendation frame in the framing recommendation result is less than a first threshold and is greater than or equal to a second threshold, the first threshold is set based on an imaging range corresponding to a camera with a large field of view in the at least two cameras, and the second threshold is set based on an imaging range corresponding to a camera with a small field of view in the at least two cameras.

16. The electronic device according to claim 15, wherein each of the at least one framing recommendation result further comprises at least one of a horizontal reference line or a vertical reference line, and the horizontal reference line and the vertical reference line indicate to rotate the images captured by the at least two cameras to obtain the target image.

17. The electronic device according to claim 15, wherein each of the at least one framing recommendation result further comprises a thumbnail corresponding to the framing recommendation frame in the framing recommendation result, and the thumbnail is obtained through cropping, based on the framing recommendation frame in the framing recommendation result, the images captured by the at least two cameras.

* * * * *